US010623469B2

(12) United States Patent
Sun (10) Patent No.: US 10,623,469 B2
(45) Date of Patent: Apr. 14, 2020

(54) METHODS AND APPARATUSES FOR INFORMATION TRANSMISSION

(71) Applicant: ALIBABA GROUP HOLDING LIMITED, George Town, Grand Cayman (KY)

(72) Inventor: Yuanbo Sun, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 495 days.

(21) Appl. No.: 15/327,639

(22) PCT Filed: Jul. 3, 2015

(86) PCT No.: PCT/CN2015/083261
§ 371 (c)(1),
(2) Date: Jan. 19, 2017

(87) PCT Pub. No.: WO2016/011885
PCT Pub. Date: Jan. 28, 2016

(65) Prior Publication Data
US 2017/0214734 A1  Jul. 27, 2017

(30) Foreign Application Priority Data

Jul. 24, 2014 (CN) .......................... 2014 1 0356172

(51) Int. Cl.
*H04L 29/08* (2006.01)
(52) U.S. Cl.
CPC ............ *H04L 67/06* (2013.01); *H04L 67/141* (2013.01); *H04L 67/2814* (2013.01)
(58) Field of Classification Search
CPC ... H04L 67/06; H04L 67/141; H04L 67/2814; H04L 61/2521
See application file for complete search history.

(56) References Cited

U.S. PATENT DOCUMENTS

| 2010/0014459 | A1* | 1/2010 | Mir | ......................... H04L 45/60 370/328 |
| 2013/0210379 | A1* | 8/2013 | Cloutier | ................ H04W 76/10 455/405 |

(Continued)

FOREIGN PATENT DOCUMENTS

| CN | 102045350 A | 5/2011 |
| CN | 102547707 A | 7/2012 |

(Continued)

OTHER PUBLICATIONS

Tetsuyuki Kobayashi, ADB (Android Debug Bridge): How it works?, Feb. 13, 2012, Android Builders Summit, p. 7, 12 (Year: 2012).*

(Continued)

*Primary Examiner* — Wing F Chan
*Assistant Examiner* — Billy H Ng
(74) *Attorney, Agent, or Firm* — Finnegan, Henderson, Farabow, Garrett & Dunner, LLP (57) ABSTRACT

The present application discloses methods and apparatuses for information transmission. An exemplary method may include establishing, by the first terminal, an information transmission channel between the second terminal and the external network based on the connection between the first terminal and the second terminal and the connection between the first terminal and the external network. The method may also include transferring an information request, sent by the second terminal, to the external network through the information transmission channel. The method may further include transferring received information corresponding to the information request to the second terminal through the information transmission channel. The second terminal may directly acquire information from the external network or upload information to the external network, rather than passively receiving the retrieval or push data from the first terminal. It may achieve a seamless connection (Continued)

for the information transmission between the second terminal and the external network. Accordingly, it would effectively improve the efficiency of the information transmission.

15 Claims, 3 Drawing Sheets

(56) References Cited

U.S. PATENT DOCUMENTS

| | | | |
|---|---|---|---|
| 2014/0129713 | A1 | 5/2014 | Ylimartimo |
| 2016/0286588 | A1* | 9/2016 | Gulliksson ............ H04W 76/14 |

FOREIGN PATENT DOCUMENTS

| | | | |
|---|---|---|---|
| CN | 103095850 | A | 5/2013 |
| CN | 103369707 | A | 10/2013 |
| CN | 103945564 | A | 7/2014 |

OTHER PUBLICATIONS

First Chinese Search Report issued in Chinese Application No. 201410356172.2, dated Dec. 6, 2017 (1 pg.).

PCT International Written Opinion dated Sep. 29, 2015, issued in corresponding International Application No. PCT/CN2015/083261 (8 pgs.).

First Office Action dated Dec. 15, 2017, issued by the State of Intellectual Property Office of People's Republic of China issued in a counterpart Chinese Patent Application No. 201410356172.2 (11 pgs.).

Second Office Action dated Jul. 9, 2018, issued by the State of Intellectual Property Office of People's Republic of China issued in a counterpart Chinese Patent Application No. 201410356172.2 (13 pgs.).

Supplemental Chinese Search Report issued in Chinese Application No. 201410356172.2, dated Jun. 27, 2018 (1 pg.).

PCT International Search Report dated Sep. 29, 2015, issued in corresponding International Application No. PCT/CN2015/083261 (8 pages).

* cited by examiner

METHODS AND APPARATUSES FOR INFORMATION TRANSMISSION

CROSS REFERENCE TO RELATED APPLICATION

This application is the U.S. national stage application under 35 U.S.C. § 371 of International Application No. PCT/CN2015/083261, filed on Jul. 3, 2015, which claims priority to and the benefits of priority to Chinese Application No. 201410356172.2, filed Jul. 24, 2014, both of which are incorporated herein by reference in their entireties.

TECHNICAL FIELD

The present application relates to the field of computer technology, and more particularly, to methods and apparatuses for information transmission.

BACKGROUND

With the development of information technology, terminals such as a mobile phone, a tablet computer, and a computer, as being information carriers and rendering windows, are widely used in people's lives and work. By using a terminal that is connected to the Internet (referred to as a first terminal in the present application), a user can easily access the Internet to acquire a large amount of desired information. After another terminal that is not connected to the Internet (referred to as a second terminal in the present application) is connected to the first terminal, information between the two terminals can be transmitted. It allows the two terminals to exchange data for sharing or storage. The first terminal and the second terminal both may be a computer or a mobile terminal.

In the existing technology, after being connected to the first terminal, the second terminal (that is not connected to the Internet) can receive data from the Internet or the first terminal locally. The connection between the second terminal and the first terminal includes, but is not limited to, being implemented in a wired manner, such as a USB connection.

However, under the above configuration, the data received by the second terminal from the Internet or the first terminal locally can only rely on the active pushing of the first terminal. For example, after a computer that is connected to a network (the first terminal) is connected with a mobile phone (the second terminal) through a data line, the process for the mobile phone to acquire information on the Internet is as follows: The mobile user searches and downloads information from the Internet through the computer. The information will be downloaded and stored in the computer first, and then sent to the mobile phone by a software program installed on the computer.

In other words, in the case that the first terminal is connected to the second terminal, the information transmission process between the second terminal and the Internet is fussy and time-consuming. It results in inefficient information transmission.

SUMMARY

Embodiments of the present application disclose methods and apparatuses for information transmission. The methods and apparatuses may solve the problem of fussy, time-consuming, inefficient information transmission between a second terminal and the Internet where the second terminal is not directly connected to the Internet, but connected to the first terminal that is connected to the Internet.

In one aspect, the present application is directed to a method for information transmission. A first terminal is connected to an external network. A second terminal is not directly connected to the external network. The first terminal is connected to the second terminal. The method may include establishing, by the first terminal, an information transmission channel between the second terminal and the external network based on the connection between the first terminal and the second terminal and the connection between the first terminal and the external network. The method may also include transferring an information request, sent by the second terminal, to the external network through the information transmission channel. The method may further include transferring received information corresponding to the information request to the second terminal through the information transmission channel.

In another aspect, the present application is directed to an apparatus for information transmission. The apparatus may include an information-channel establishing module establishing an information transmission channel between the second terminal and the external network based on the connection between the first terminal and the second terminal and the connection between the first terminal and the external network. The apparatus may also include a transmission module sending an information request, sent by the second terminal, to the external network through the information transmission channel, and transferring received information corresponding to the information request to the second terminal through the information transmission channel.

Embodiments of the present application disclose methods and apparatuses for information transmission. An exemplary method may include establishing, by the first terminal, an information transmission channel between the second terminal and the external network based on the connection between the first terminal and the second terminal and the connection between the first terminal and the external network. The method may also include transferring an information request, sent by the second terminal, to the external network through the information transmission channel The method may further include transferring received information corresponding to the information request to the second terminal through the information transmission channel. After the second terminal that is not connected to the Internet is connected to the first terminal that is connected to the Internet, the second terminal can directly perform information transmission with the external network through port mapping with the first terminal and a configured transceiver port. The second terminal can directly acquire information from the external network or upload information to the external network, rather than passively receiving the retrieval or push data from the first terminal. It may achieve a seamless connection for the information transmission between the second terminal and the external network. Accordingly, it would effectively improve the efficiency of the information transmission.

BRIEF DESCRIPTION OF THE DRAWINGS

The accompanying drawings described here are intended to provide a further understanding of the present application. These drawings are a part of the present application. The illustrative embodiments and the description thereof in the present application are given to explain the present application and will not constitute an improper limitation on the present application.

DETAILED DESCRIPTION

To make the objectives, technical solutions, and advantages of the present application clear, the technical solutions of the present application are described clearly and completely with reference to specific embodiments and corresponding accompanying drawings of the present application. The embodiments described below are merely a part of embodiments of the present application, not all of the embodiments of the present applications. Based on these embodiments in the present application, all other embodiments derived by a person of ordinary skill in the art without creative efforts shall fall within the protection scope of the present application.

Figure 1:
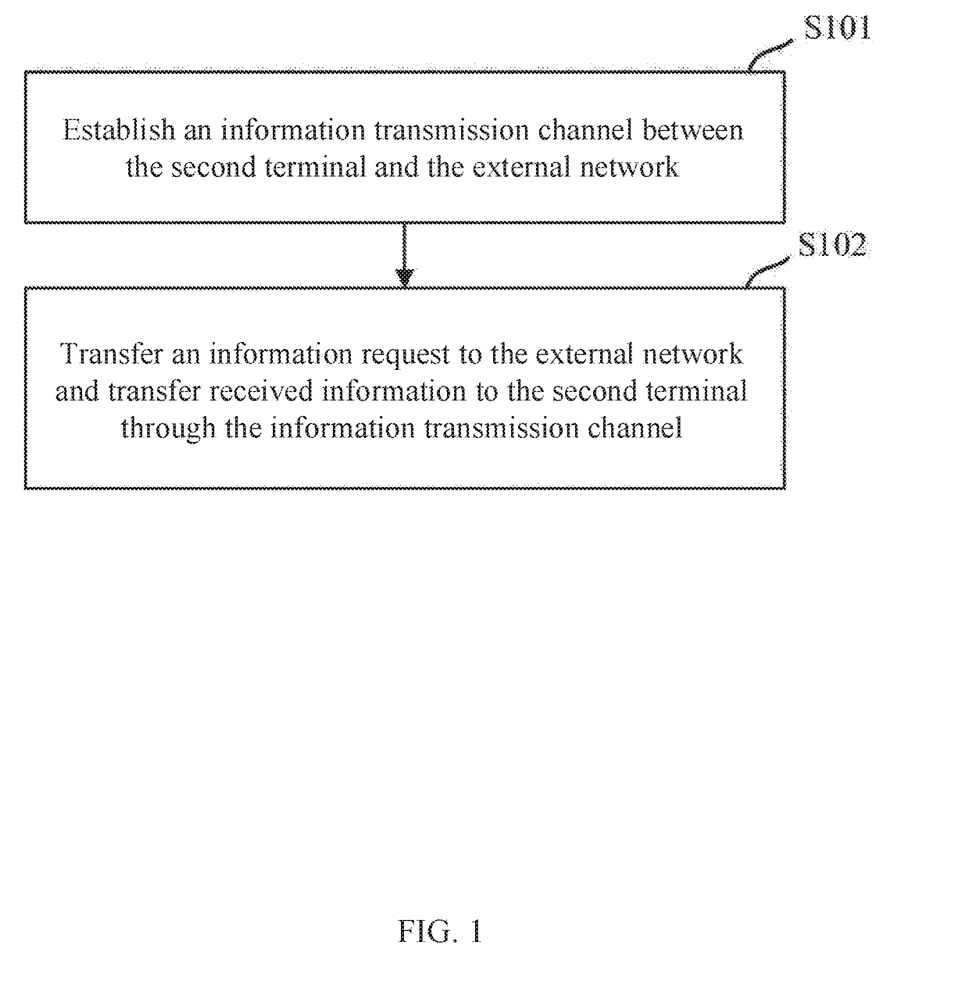
FIG. 1 is an illustration of an exemplary method for information transmission, in accordance with an embodiment of the present application.

FIG. 1 is an illustration of an exemplary method for information transmission, in accordance with an embodiment of the present application. The method may include the following steps:

S101: establishing, by the first terminal, an information transmission channel between the second terminal and the external network based on the connection between the first terminal and the second terminal and the connection between the first terminal and the external network.

In this step, the first terminal is connected to the external network. The second terminal is not connected to the external network. The first terminal is connected to the second terminal.

The second terminal may include, but is not limited to, a computer or a mobile terminal such as a mobile phone and a tablet computer. In the present application, a connection between a terminal apparatus (i.e., the first terminal) that is connected to an external network and the second terminal may be established in advance. The external network may include, but is not limited to, the Internet or an external local area network. The connection between the first terminal and the second terminal may be implemented in a wireless manner such as infrared light, Bluetooth, and Near Field Communication (NFC). The connection may alternatively be implemented in a wired manner such as a universal serial bus (USB) and a parallel bus.

After the connection between the first terminal and the second terminal is established, the first terminal may further establish an information transmission channel between the second terminal and the external network.

Through the information transmission channel, the second terminal may be connected to the external network to which the first terminal is connected. It will allow the second terminal to have direct information transmission with the external network. It is unnecessary for the user to firstly download and store the required information through the first terminal, and then transmit the information to the second terminal through software. The information does not stay in the first terminal. The information is directly transmitted from the external network to the second terminal through the information transmission channel, thereby efficiently enhancing the transmission efficiency of the information.

The step of establishing, by the first terminal, an information transmission channel between the second terminal and the external network may include creating port mapping between the first terminal and the second terminal. The step may include sending information about the network proxy to the second terminal. The information about the network proxy may contain information about the network proxy port of the first terminal. The second terminal may configure a transceiver port of the second terminal in accordance with the information about the network proxy port.

It should be noted that the port mapping is to convert an Internet Protocol (IP) address of the terminal or a physical address of a transmission interface. For example, a plurality of terminals are connected to a router to constitute a local area network. These terminals connect to the external network through the router. In the local area network, each terminal has its internal IP address (for example, 192.168.1.2, the internal IP address can also be referred to as an intranet IP address). A terminal in other local area networks may also use the same internal IP address. If these terminals directly use their internal IP addresses to access the external network, it may cause IP address conflicts in the external network. Therefore, when a terminal accesses the external network, it is necessary to perform the port mapping. The internal IP address may be converted into a unique public network IP address assigned by the external network to the router.

In the embodiments of the present application, after the port mapping is established between the second terminal and the first terminal, it may be deemed that the second terminal and the first terminal form a local area network. The second terminal (which may be deemed as a terminal in the local area network) may access the external network through the first terminal (which may be deemed as a routing apparatus in the local area network). More specifically, the method of the port mapping performed between the second terminal and the first terminal may include that the first terminal acquires information about the intranet IP address of the second terminal. The method may also include establishing a mapping relationship between information about the public network IP address of the first terminal and the information about the intranet IP address of the second terminal, and recording the mapping relationship. The information about the public network IP address is the information about the network IP address allocated to the first terminal by the external network.

In the process of port mapping, the information acquired from the second terminal by the first terminal is not limited to the information about the intranet IP address of the second terminal. In another scenario, the first terminal may acquire interface information about a transmission interface of the second terminal. The interface information may include, but is not limited to, a physical address of the second terminal and an interface identification of the current transmission interface. In this way, even in the case that a corresponding intranet IP address is not assigned to the second terminal, the information such as the physical address of the second terminal and the identification of the transmission interface can also be acquired from the corresponding interface information. Therefore, through the interface information, the second terminal and the transmission interface of the second terminal can be determined for the implementation of the port mapping.

After the port mapping is completed, in the process of sending the information request, the first terminal may replace the information about the intranet IP address or the interface of the second terminal by the information about the public network IP address of the first terminal, and send it to the external network. In this way, from the view of the external network, the information request comes from the public network IP address. The use of the public network IP address can meet the transmission specifications, and ensure no IP address conflicts will occur. In the process of returning information, the first terminal may replace, in accordance with the recorded mapping relationship, the information about its public network IP address with the information about the intranet IP address of the second terminal, and the returned information is sent to the intranet IP address, i.e., sent to the second terminal.

In the local area network constituted by the first terminal and the second terminal, the first terminal can be equivalent to a routing apparatus having a proxy function. Therefore, in the process of establishing the information transmission channel, the first terminal may send the information about its network proxy to the second terminal. The second terminal may configure a transceiver port (the transceiver port refers to a network proxy port in the first terminal) required for accessing in the system thereof in accordance with the network proxy information. After the transceiver port is configured, the second terminal sends a variety of network requests therein to the network proxy port of the first terminal.

The network proxy port is a port for the first terminal acting as a routing apparatus to perform information transmission with the external network. In the above process, the second terminal configuring the transceiver port refers to that the second terminal performs information transmission through a specified port of the first terminal. The second terminal may deliver an information request to the first terminal. The first terminal may send the information request to the external network through this port specified by the second terminal. It can be deemed that the first terminal "acts for" the second terminal to send the information request.

In view of the above, based on the mapping relationship between the public network IP address and the intranet IP address, and the transceiver port configured by the second terminal, the information transmission channel between the second terminal and the external network is established. Accordingly, the second terminal can directly perform information transmission with the external network, i.e., Step S102.

S102: transferring an information request, sent by the second terminal, to the external network through the information transmission channel, and transferring received information corresponding to the information request to the second terminal through the information transmission channel.

The operations of transferring the information request, sent by the second terminal, to the external network through the information transmission channel may include receiving, by the first terminal, the information request sent by the second terminal. The information request may contain information about the intranet IP address of the second terminal and the transceiver port configured by the second terminal. The operations may also include converting, by the first terminal, the information about the intranet IP address of the second terminal contained in the information request into information about the public network IP address of the first terminal in accordance with the recorded mapping relationship. The operation may further include sending, by the first terminal, the converted information request to the external network.

The operations of transferring received information corresponding to the information request to the second terminal through the information transmission channel may include receiving, by the first terminal, the information corresponding to the information request returned from the external network. The received information may contain the information about the public network IP address of the first terminal. The operations may also include determining, by the first terminal, the information about the intranet IP address of the second terminal corresponding to the information about the public network IP address of the first terminal in accordance with the recorded mapping relationship. The operation may further include transferring the received information to the second terminal in accordance with the information about the intranet IP address of the second terminal.

In practical application scenarios, the first terminal may be connected to a plurality of second terminals at the same time. To avoid confusion in the information transmission, the first terminal records the mapping relationship that has been established. When the external network returns the data, the first terminal transfers the data accurately to the corresponding second terminal in accordance with the recorded mapping relationship.

Through the above step, after the second terminal that is not connected to the external network is connected to the first terminal that is connected to the external network, the second terminal, through port mapping with the first terminal and the configured transceiver port, can directly perform information transmission with the external network. The second terminal can directly acquire the information from the external network or upload the information to the external network, rather than passively receiving a fetch request or push data from the first terminal, thereby achieving a seamless connection for the information transmission between the second terminal and the external network. It may also effectively enhance the efficiency of the information transmission.

Figure 2:
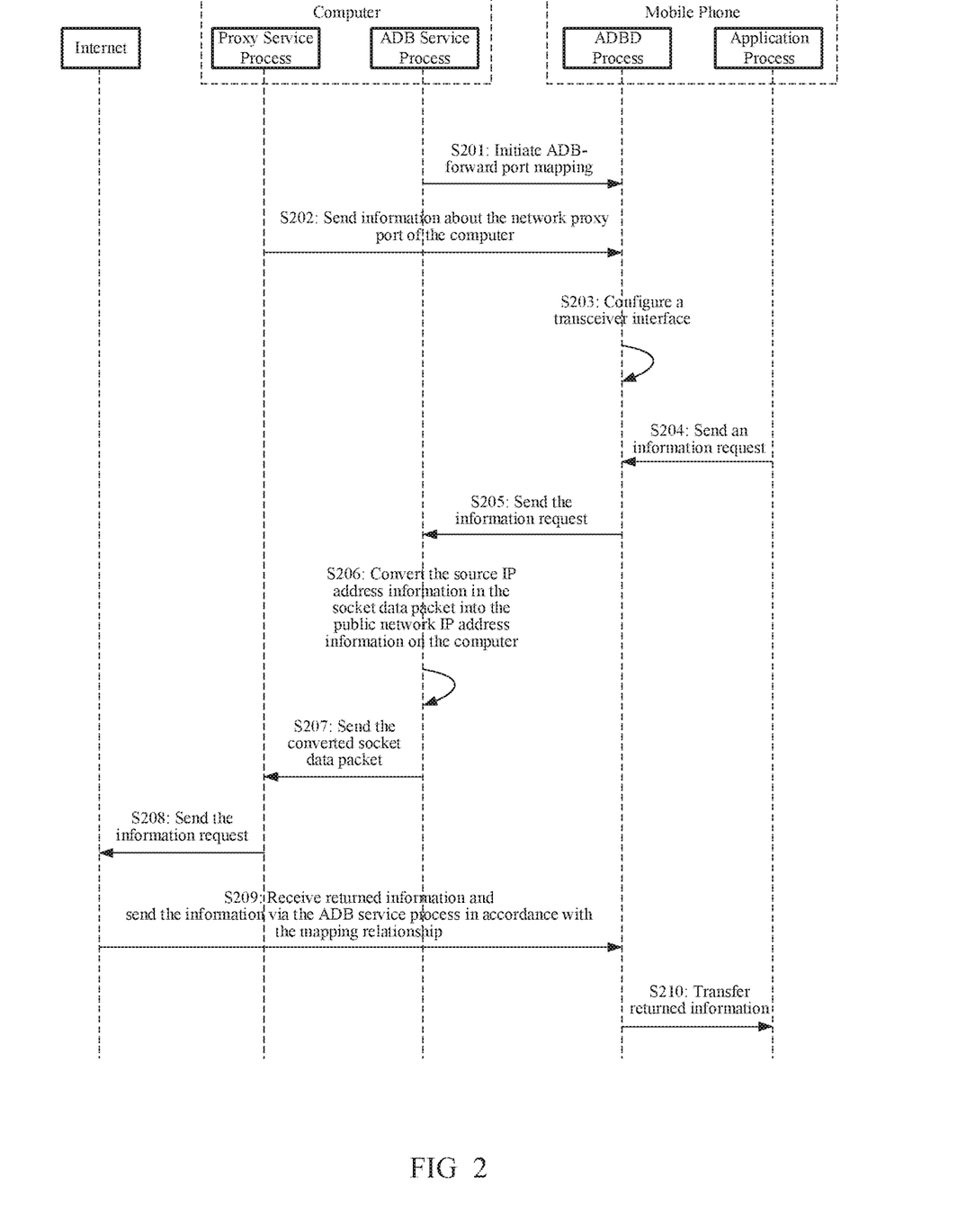
FIG. 2 is an illustration of an exemplary process of information transmission in an exemplary, realistic application scenario, in accordance with an embodiment of the present application.

FIG. 2 is an illustration of an exemplary process of information transmission in an exemplary, realistic application scenario, in accordance with an embodiment of the present application.

In the practical application scenarios, the first terminal may be a computer connected to the Internet. The second terminal may be a mobile phone that is not connected to the Internet. The mobile phone may establish a connection with the computer through a USB data line. The mobile phone on which, for example, may run an Android operation system. In this case, the mobile phone may establish a connection with the computer through an Android Debug Bridge (ADB). After the connection is established, an ADB service process may be created and run in the background on the computer. It may serve as a unique interface for the interaction with the mobile phone. Accordingly, an ADBD (Android Debug Bridge Device) process may be created in the mobile phone for receiving information sent by the ADB service process on the computer, and performing corresponding operations. In this scenario, the exemplary process of information transmission may include:

S201: initiating, by the ADB service process in the computer, ADB-forward port mapping to the ADBD process in the mobile phone.

In this step, ADB-forward is an Android-based port mapping instruction. After the computer initiates the instruction to the mobile phone, the computer may obtain connection information on the mobile phone from the ADBD process of the mobile phone (the connection information may include, but is not limited to, information about the intranet IP address of the mobile phone, the physical address of the mobile phone, and so on). The computer may also create a mapping relationship between the information about the public network IP address of the computer and the connection information on the mobile phone, thereby establishing port mapping between the computer and the mobile phone.

In this exemplary scenario, the public network IP address of the computer may be assumed as 111.204.252.208, and the intranet IP address of the mobile phone is assumed as 192.168.1.2.

S202: sending, by the proxy service process in the computer, information about the network proxy port of the computer to the ADBD process.

The information about the network proxy port is generated by the proxy service process in the computer. In this scenario, the computer and the mobile phone may constitute a small local area network. The computer in the local area network is equivalent to a routing apparatus having a proxy function, which transfers the information request subsequently issued by the mobile phone to the Internet through a network proxy port. In this exemplary scenario, a port number of the network proxy port may be assumed as 5000 (the port number of the terminal apparatus is in a range from 0 to 65535).

S203: configuring, by the ADBD process in the mobile phone, a transceiver interface in accordance with the network port information after receiving the information about the network proxy port sent by the computer.

The ADBD process in the mobile phone may set the transceiver port of the mobile phone in accordance with the information about the network proxy port. In other words, the mobile phone may set the internal transceiver port consistent with the port in the information about the network proxy port. In this exemplary scenario, the number of the network proxy port in the information about the network proxy port in the computer is 5000. After receiving the information about the network proxy port, the mobile phone may set the internal transceiver port as 5000 as well. Moreover, the transceiver port points to the public network IP address of the computer, i.e., the transceiver port points to 111.204.252.208: 5000. As a result, various requests generated in the mobile phone may be directly sent to the port.

S204: sending an information request by the ADBD process which may be called by an application in the mobile phone.

Information requests issued by an application may correspond to different destination IP addresses and destination ports. These destination IP addresses and the destination ports may point to corresponding network servers or databases. The information requests issued by the application may be all Hypertext Transfer Protocol (HTTP) requests.

It should be noted that multiple applications in the mobile phone may respectively issue different information requests, and transmit them over the same port. To distinguish different application processes and connections, the computer may generate corresponding socket data packages based on the information requests issued by those applications. A socket data packet may contain the information request and the five-tuple information corresponding to the information request, including source IP address information, source port information, destination IP address information, destination port information, and transmission protocol information. In the exemplary scenario, the source IP address information is the intranet IP address information on the mobile phone, 192.168.1.2. The source port information is the information about the (configured) network proxy port of the computer, 5000. The destination IP address information is the IP address information on the server to be accessed by the information request. That is 220.181.118.87 in this exemplary scenario. The destination port information is the port information on the server to be accessed by the information request, 8080.

The ADBD process may record every calling operation and the initiator of the calling operation. The recorded content may be the program identification of an application program initiating the calling operation, such as information about the program name and its version number. In some application scenarios, other information may also be recorded. It does not constitute any limitation to the present application.

S205: sending the information request, by the ADBD process of the mobile phone, to the computer, and receiving the information request through the ADB service process by the computer.

S206: converting, by the ADB service process, the source IP address information (i.e., the intranet IP address information on the mobile phone) in the socket data packet into the public network IP address information on the computer in accordance with the mapping relationship.

Specifically, the computer may replace the intranet IP address, 192.168.1.2, of the mobile phone with the public network IP address, 111.204.252.208, of the computer in accordance with the mapping relationship.

S207: sending, by the ADB service process of the computer, the converted socket data packet to the proxy service process of the computer.

Because the mobile phone may have configured its transceiver port and pointed to 111.204.252.208: 5000, the ADB service process may send the socket data packet as a whole to the network proxy port having the port number of 5000 under the public network IP address of the computer.

S208: sending, by the proxy service process, the information request to the Internet in accordance with the destination IP address information and the destination port information in the socket data packet.

At this moment, the source IP address may have been changed to 111.204.252.208 (that is, the public network IP address of the computer), and the source port is 5000 (that is, the network proxy port of the computer). The proxy service process may send the information request to the corresponding port of the corresponding server to acquire information.

S209: receiving, by the computer, information, returned by the Internet, corresponding to the information request in the socket data packet, and sending the information to the ADBD process of the mobile phone via the ADB service process in the computer in accordance with the mapping relationship.

The returned information is sent to the computer by the server. Therefore, the destination IP address and the destination port used in the previous information request have become the source IP address and the source port. Hence the source IP address is 220.181.118.87, and the source port is 8080. The public network IP address 111.204.252.208 and the network proxy port 5000 of the computer have respectively become the destination IP address and the destination port of the information.

The information is sent to the mobile phone immediately after being sent to the computer. At this moment, the public network IP address 111.204.252.208 and the network proxy port 5000 of the computer have respectively become the source IP address and the source port of the information. The destination IP address of the information may be changed to the intranet IP address 192.168.1.2 of the mobile phone. The information may be directly transmitted to the mobile phone through the network proxy port 5000.

S210: transferring the information to the corresponding application by the ADBD process of the mobile phone.

The ADBD process of the mobile phone may transfer the information to the corresponding application in accordance with the previously recorded content.

In some embodiments, the computer may also be connected to a tablet computer through a USB data line, and the intranet IP address of the tablet computer may be 192.168.1.3. The computer may proceed with the above steps to establish another information transmission channel between the tablet computer and the Internet. It should be noted that the computer may record the port mapping relationships between the computer and the mobile phone, and between the computer and the tablet computer respectively. With respect to the information corresponding to the information request issued by the mobile phone, the computer may send the information to 192.168.1.2 in accordance with the recorded mapping relationship. With respect to the information corresponding to the information request issued by the tablet computer, the computer may send the information to 192.168.1.3 in accordance with the recorded mapping relationship. In this way, it may avoid the confusion while transferring information.

In view of the above, information transmission may be directly performed between the mobile phone and the Internet. Although the information is transferred via the computer, the information may be no longer stored on the computer. Transmission traffic in the information transmission process may be reduced. Moreover, there is a risk that the information stored in the computer may be lost or leaked out. Therefore direct information transmission between the mobile phone and the Internet may also enhance the security in the information transmission process.

The above content is with respect to the information transmission between the second terminal and the external network. In some embodiments, the above method may also allow the second terminal to perform information transmission directly with the first terminal by using the established information transmission channel.

The above is the method for information transmission in accordance with the embodiments of the present application. Based on the same concepts, the present application also discloses an apparatus for information transmission, as shown in FIG. 3.

Figure 3:
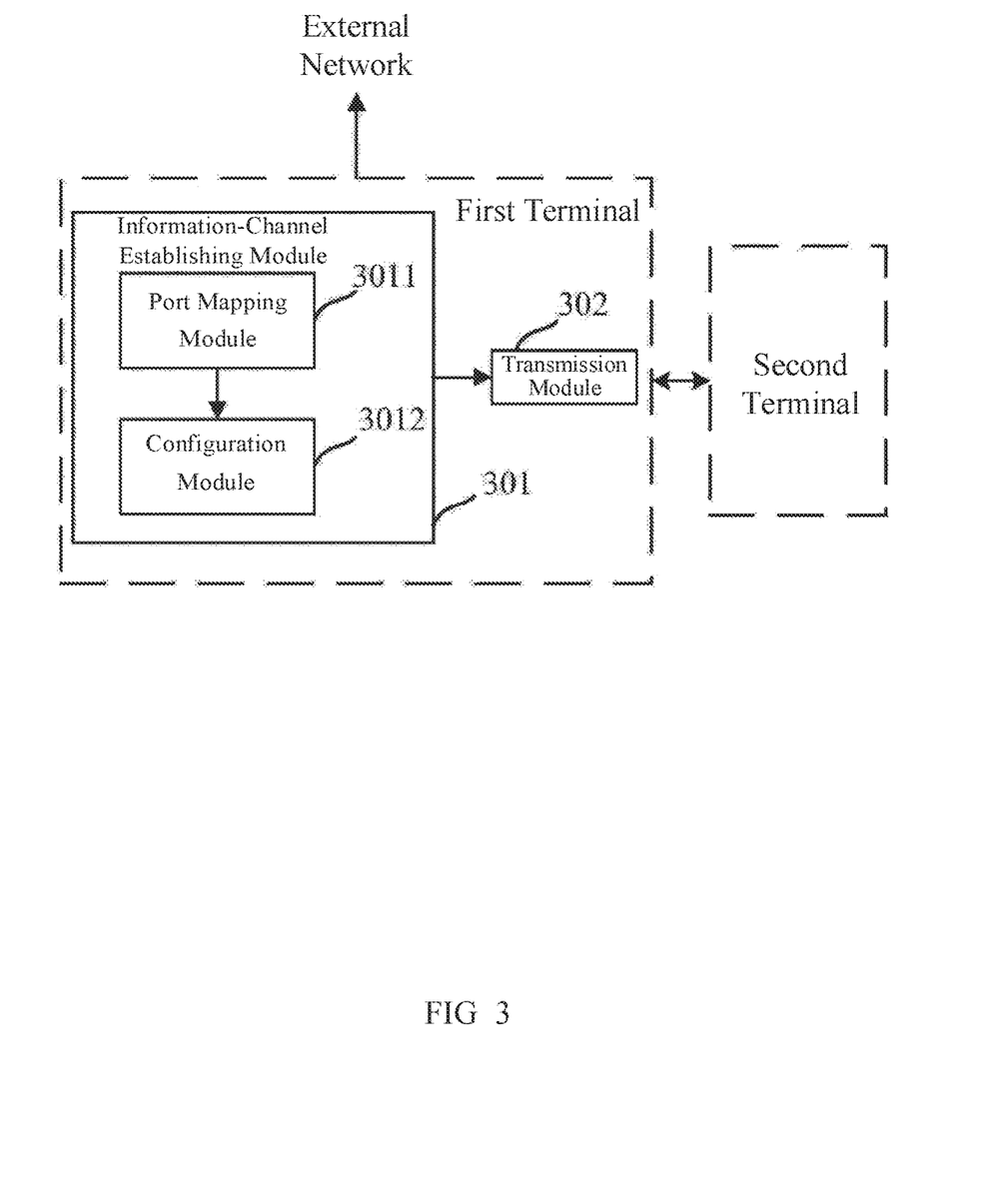
FIG. 3 is an illustrative structural diagram of an exemplary apparatus for information transmission, in accordance with an embodiment of the present application.

The apparatus for information transmission in FIG. 3 may be configured in a first terminal. The first terminal may be connected to an external network. A second terminal is not connected to the external network. The first terminal is connected to the second terminal. The apparatus may include an information-channel establishing module 301 and a transmission module 302.

Information-channel establishing module 301 may be configured to establish an information transmission channel between the second terminal and the external network based on the connection between the first terminal and the second terminal and the connection between the first terminal and the external network. The apparatus may also include transmission module 302 configured to send an information request, sent by the second terminal, to the external network through the information transmission channel, and transfer received information corresponding to the information request to the second terminal through the information transmission channel.

Specifically, information-channel establishing module 301 may include a port mapping module 3011 and a configuration module 3012.

Port mapping module 3011 may be configured to establish the port mapping between the first terminal and the second terminal.

Configuration module 3012 may be configured to send information about the network proxy port of the first terminal to the second terminal to allow the second terminal to configure a transceiver port of the second terminal in accordance with the information about the network proxy port.

Port mapping module 3011 may be configured to acquire information about the intranet Internet Protocol (IP) address of the second terminal. Port mapping module 3011 may also be configured to establish and record a mapping relationship between information about the public network IP address of the first terminal and the information about the intranet IP address of the second terminal. The information about the public network IP address is the information about the network IP address allocated to the first terminal by the external network.

After the information transmission channel is established, transmission module 302 may be configured to receive the information request sent by the second terminal. The information request may contain information about the intranet IP address of the second terminal and the transceiver port configured by the second terminal. Transmission module 302 may also be configured to convert, by the first terminal, the information about the intranet IP address of the second terminal contained in the information request into information about the public network IP address of the first terminal in accordance with the recorded mapping relationship. Transmission module 302 may be further configured to send the converted information request to the external network.

The above process is about sending the information request of the second terminal to the external network. When information is returned from the external network, transmission module 302 may be configured to receive the information corresponding to the information request returned from the external network. The received information may contain the information about the public network IP address of the first terminal. Transmission module 302 may also be configured to determine the information about the intranet IP address of the second terminal corresponding to the information about the public network IP address of the first terminal in accordance with the recorded mapping relationship. Transmission module 302 may be further configured to transfer the received information to the second terminal in accordance with the information about the intranet IP address of the second terminal.

In a typical configuration, a computing apparatus may include one or more processors (e.g., CPUs), an input/output interface, a network interface, and a memory.

The memory may include various types of computer-readable media such as a volatile memory, a random access memory (RAM), and/or a non-volatile memory. For example, a read-only memory (ROM) or a flash RAM is a non-volatile memory. Memory is an example of computer-readable media.

The computer readable medium may include non-volatile and volatile media and movable and non-movable media. The computer readable medium may implement information storage by means of any method or technology. Information may be a computer readable instruction, a data structure, a module of programs, or other data. A storage medium of a computer may include, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage apparatuses, or any other non-transmission medium. A storage medium of a computer may be used to store information accessed by the computing apparatus. According to the definition of the present application, the computer readable medium does not include transitory media, such as a modulated data signal and a carrier.

It should be further noted that terms "comprise," "include," or any other variations thereof are intended to cover non-exclusive inclusion. Processes, methods, objects, or apparatuses that comprise a series of essentials may not only include these essentials, but may also include other essentials that are not explicitly listed. They may further include essentials inherent in the processes, methods, objects or apparatuses. Without further restrictions, an essential defined by the wording of "comprising a . . . " does not preclude the further inclusion of other identical essential in the processes, methods, objects or apparatuses.

Those skilled in the art could understand that the embodiments of the present application may be implemented as a method, a system, or a computer program product. Accordingly, the present application may take the form of an entirely hardware implementation, an entire software implementation or an implementation combining software and hardware. Furthermore, the present application may take the form of a computer program product implemented on a computer-usable storage medium (including but not limited to magnetic disk memories, CD-ROMs, optical memories, etc.) including computer-usable program code.

The above are only embodiments of the present application and not used for limiting the present application. For those skilled in the art, the present application may have various modifications and changes. Any modification, equivalent replacement, improvement and the like made within the spirit and principle of the present application shall fall within the protection scope of the claims of the present application.

What is claimed is:

1. A method for information transmission, wherein a first terminal is connected to an external network, a second terminal is not connected to the external network, and the first terminal is connected to the second terminal, the method comprising:
    establishing, by the first terminal, an information transmission channel between the second terminal and the external network based on the connection between the first terminal and the second terminal and the connection between the first terminal and the external networks wherein the establishing includes:
        creating port mapping between the first terminal and the second terminal: and
        sending, by the first terminal, information about a network proxy port of the first terminal to the second terminal, wherein the information about the network proxy port is used by the second terminal to configure a transceiver port of the second terminal for communicating with the external network;
    transferring an information request, sent by the second terminal, to the external network through the information transmission channel; and
    transferring received information corresponding to the information request to the second terminal through the information transmission channel.

2. The method of claim 1, wherein creating the port mapping between the first terminal and the second terminal includes:
    acquiring information about an intranet Internet Protocol (IP) address of the second terminal; and
    establishing and recording a mapping relationship between information about an public network IP address of the first terminal and the information about the intranet IP address of the second terminal, wherein the information about the public network IP address is information about a network IP address allocated to the first terminal by the external network.

3. The method of claim 2, wherein transferring the information request, sent by the second terminal, to the external network through the information transmission channel includes:
    receiving, by the first terminal, the information request sent by the second terminal, the information request containing the information about the intranet IP address of the second terminal and the transceiver port configured by the second terminal;
    converting, by the first terminal, the information about the intranet IP address of the second terminal contained in the information request into the information about the public network IP address of the first terminal in accordance with the recorded mapping relationship; and
    sending, by the first terminal, the converted information request to the external network.

4. The method of claim 2, wherein transferring the received information corresponding to the information request to the second terminal through the information transmission channel includes:
    receiving, by the first terminal, the information corresponding to the information request returned from the external network, the received information containing the information about the public network IP address of the first terminal;
    determining, by the first terminal, the information about the intranet IP address of the second terminal corresponding to the information about the public network IP address of the first terminal in accordance with the recorded mapping relationship; and
    transferring the received information to the second terminal in accordance with the information about the intranet IP address of the second terminal.

5. An apparatus for information transmission, wherein the apparatus is a first terminal or an information transmission apparatus connected to the first terminal, the first terminal is connected to an external network, a second terminal is not connected to the external network, and the first terminal is connected to the second terminal, the apparatus comprising:
    a memory storing a set of instructions: and
    one or more processors configured to execute the set of instructions to cause the apparatus to perform:
        establishing an information transmission channel between the second terminal and the external network based on the connection between the first terminal and the second terminal and the connection between the first terminal and the external network, wherein the establishing includes:

creating port mapping between the first terminal and the second terminal: and sending, by the first terminal, information about a network proxy port of the first terminal to the second terminal, wherein the information about the network proxy port is used by the second terminal to configure a transceiver port of the second terminal for communicating with the external network: and sending an information request, sent by the second terminal, to the external network through the information transmission channel, and transferring received information corresponding to the information request to the second terminal through the information transmission channel.

6. The apparatus of claim 5, wherein creating the port mapping between the first terminal and the second terminal includes:

acquiring information about an intranet Internet Protocol (IP) address of the second terminal; and establishing and recording the mapping relationship between information about an public network IP address of the first terminal and the information about the intranet IP address of the second terminal, wherein the information about the public network IP address is information about a network IP address allocated to the first terminal by the external network.

7. The apparatus of claim 6, wherein sending an information request, sent by the second terminal, to the external network through the information transmission channel includes:

receiving the information request sent by the second terminal, the information request containing the information about the intranet IP address of the second terminal and the transceiver port configured by the second terminal;

converting, by the first terminal, the information about the intranet IP address of the second terminal contained in the information request into the information about the public network IP address of the first terminal in accordance with the recorded mapping relationship; and sending the converted information request to the external network.

8. The apparatus of claim 6, wherein transferring the received information corresponding to the information request to the second terminal through the information transmission channel includes:

receiving the information corresponding to the information request returned from the external network, the received information containing the information about the public network IP address of the first terminal;

determining the information about the intranet IP address of the second terminal corresponding to the information about the public network IP address of the first terminal in accordance with the recorded mapping relationship; and transferring the received information to the second terminal in accordance with the information about the intranet IP address of the second terminal.

9. A non-transitory computer readable medium that stores a set of instructions that is executable by at least one processor of an apparatus to cause the apparatus to perform a method for information transmission, wherein a first terminal is connected to an external network, a second terminal is not connected to the external network, and the first terminal is connected to the second terminal, the method comprising:

establishing, by the first terminal, an information transmission channel between the second terminal and the external network based on the connection between the first terminal and the second terminal and the connection between the first terminal and the external network, wherein the establishing includes:

creating port mapping between the first terminal and the second terminal: and sending, by the first terminal, information about a network proxy port of the first terminal to the second terminal, wherein the information about the network proxy port is used by the second terminal to configure a transceiver port of the second terminal for communicating with the external network:

transferring an information request, sent by the second terminal, to the external network through the information transmission channel; and transferring received information corresponding to the information request to the second terminal through the information transmission channel.

10. The non-transitory computer readable medium of claim 9, wherein creating the port mapping between the first terminal and the second terminal includes:

acquiring information about an intranet Internet Protocol (IP) address of the second terminal; and establishing and recording a mapping relationship between information about an public network IP address of the first terminal and the information about the intranet IP address of the second terminal, wherein the information about the public network IP address is information about a network IP address allocated to the first terminal by the external network.

11. The non-transitory computer readable medium of claim 10, wherein transferring the information request, sent by the second terminal, to the external network through the information transmission channel includes:

receiving, by the first terminal, the information request sent by the second terminal, the information request containing the information about the intranet IP address of the second terminal and the transceiver port configured by the second terminal;

converting, by the first terminal, the information about the intranet IP address of the second terminal contained in the information request into the information about the public network IP address of the first terminal in accordance with the recorded mapping relationship; and sending, by the first terminal, the converted information request to the external network.

12. The non-transitory computer readable medium of claim 10, wherein transferring the received information corresponding to the information request to the second terminal through the information transmission channel includes:

receiving, by the first terminal, the information corresponding to the information request returned from the external network, the received information containing the information about the public network IP address of the first terminal;

determining, by the first terminal, the information about the intranet IP address of the second terminal corresponding to the information about the public network IP address of the first terminal in accordance with the recorded mapping relationship; and transferring the received information to the second terminal in accordance with the information about the intranet IP address of the second terminal.

13. A method for information transmission, wherein a first terminal is connected to an external network, a second terminal is not connected to the external network, and the first terminal is connected to the second terminal, the method comprising:

sending, by the second terminal, a request to the first terminal to establish an information transmission channel between the second terminal and the external network based on the connection between the first terminal and the second terminal and the connection between the first terminal and the external network;

receiving, by the second terminal, information about a network proxy port of the first terminal, wherein the information about the network proxy port is used by the second terminal to configure a transceiver port of the second terminal for communicating with the external network;

sending, by the second terminal, an information request to the external network through the information transmission channel; and receiving, by the second terminal, received information corresponding to the information request through the information transmission channel.

14. The method of claim 13, wherein sending the request to establish an information transmission channel includes:

sending information about an intranet Internet Protocol (IP) address of the second terminal;

sending information about the intranet Internet Protocol (IP) address and a transmission interface of the second terminal; or sending information about the intranet Internet Protocol (IP) address, the transmission interface, and a physical address of the second terminal.

15. A non-transitory computer readable medium that stores a set of instructions that is executable by at least one processor of a second terminal to cause the second terminal to perform a method for information transmission, wherein a first terminal is connected to an external network, the second terminal is not connected to the external network, and the first terminal is connected to the second terminal, the method comprising:

sending, a request to the first terminal to establish an information transmission channel between the second terminal and the external network based on the connection between the first terminal and the second terminal and the connection between the first terminal and the external network;

receiving information about a network proxy port of the first terminal, wherein the information about the network proxy port is used by the second terminal to configure a transceiver port of the second terminal for communicating with the external network;

sending an information request to the external network through the information transmission channel; and receiving received information corresponding to the information request through the information transmission channel.

* * * * *

UNITED STATES PATENT AND TRADEMARK OFFICE
CERTIFICATE OF CORRECTION

PATENT NO. : 10,623,469 B2
APPLICATION NO. : 15/327639
DATED : April 14, 2020
INVENTOR(S) : Yuanbo Sun It is certified that error appears in the above-identified patent and that said Letters Patent is hereby corrected as shown below:

On the Title Page

Item (30) Foreign Application Priority Data, "2014 1 0356172" should read as --201410356172.2--.

Signed and Sealed this
Thirteenth Day of February, 2024

Katherine Kelly Vidal
*Director of the United States Patent and Trademark Office*